US009656214B2

(12) United States Patent
Miller et al.

(10) Patent No.: US 9,656,214 B2
(45) Date of Patent: May 23, 2017

(54) GRAPHENE MEMBRANE LAMINATED TO POROUS WOVEN OR NONWOVEN SUPPORT

(71) Applicant: Empire Technology Development LLC, Wilmington, DE (US)

(72) Inventors: Seth Adrian Miller, Englewood, CO (US); Gary L. Duerksen, Ward, CO (US)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 629 days.

(21) Appl. No.: 13/982,344

(22) PCT Filed: Nov. 30, 2012

(86) PCT No.: PCT/US2012/067458
§ 371 (c)(1),
(2) Date: Jul. 29, 2013

(87) PCT Pub. No.: WO2014/084860
PCT Pub. Date: Jun. 5, 2014

(65) Prior Publication Data
US 2014/0151288 A1 Jun. 5, 2014

(51) Int. Cl.
*B01D 69/12* (2006.01)
*B01D 71/02* (2006.01)
(Continued)

(52) U.S. Cl.
CPC ............. *B01D 69/12* (2013.01); *B01D 69/10* (2013.01); *B01D 69/122* (2013.01);
(Continued)

(58) Field of Classification Search
CPC ...... B01D 69/12; B01D 69/10; B01D 71/021; B32B 3/266; B32B 9/041; B32B 9/007;
(Continued)

(56) References Cited

U.S. PATENT DOCUMENTS 4,359,510 A * 11/1982 Taskier .............. B01D 67/0088
429/144
4,857,080 A 8/1989 Baker et al.
(Continued)

FOREIGN PATENT DOCUMENTS

KR  WO 2010110624 A2 * 9/2010 ......... B01D 67/0041
WO  2012006657 A1  1/2012

OTHER PUBLICATIONS

International Search Report and Written Opinion for PCT/US2012/067458, filed Nov. 30, 2012, mailed on Feb. 6, 2013.
(Continued)

*Primary Examiner* — Lucas Stelling
*Assistant Examiner* — Angel Olivera
(74) *Attorney, Agent, or Firm* — Turk IP Law, LLC

(57) ABSTRACT

Technologies are generally described for composite membranes which may include a porous graphene layer in contact with a porous support substrate. In various examples, a surface of the porous support substrate may include at least one of: a thermo-formed polymer characterized by a glass transition temperature, a woven fibrous membrane, and/or a nonwoven fibrous membrane. Examples of the composite membranes permit the use of highly porous woven or nonwoven fibrous support membranes instead of intermediate porous membrane supports. In several examples, the composite membranes may include porous graphene layers directly laminated onto the fibrous membranes via the thermo-formed polymers. The described
(Continued)

composite membranes may be useful for separations, for example, of gases, liquids and solutions.

6 Claims, 8 Drawing Sheets

(51) Int. Cl.

| | |
|---|---|
| *B01D 69/10* | (2006.01) |
| *B32B 15/08* | (2006.01) |
| *B32B 15/14* | (2006.01) |
| *B32B 27/28* | (2006.01) |
| *B32B 27/30* | (2006.01) |
| *B32B 27/32* | (2006.01) |
| *B32B 27/34* | (2006.01) |
| *B32B 27/36* | (2006.01) |
| *B32B 27/38* | (2006.01) |
| *B32B 9/00* | (2006.01) |
| *B32B 9/04* | (2006.01) |
| *B32B 27/40* | (2006.01) |
| *B32B 5/02* | (2006.01) |
| *B32B 3/26* | (2006.01) |

(52) U.S. Cl.
CPC ............ *B01D 71/021* (2013.01); *B32B 3/266* (2013.01); *B32B 5/022* (2013.01); *B32B 5/024* (2013.01); *B32B 9/007* (2013.01); *B32B 9/041* (2013.01); *B32B 15/08* (2013.01); *B32B 15/14* (2013.01); *B32B 27/28* (2013.01); *B32B 27/30* (2013.01); *B32B 27/32* (2013.01); *B32B 27/34* (2013.01); *B32B 27/36* (2013.01); *B32B 27/38* (2013.01); *B32B 27/40* (2013.01); *B32B 2262/0253* (2013.01); *B32B 2262/106* (2013.01); *B32B 2307/54* (2013.01)

(58) Field of Classification Search
CPC ......... B32B 5/024; B32B 5/022; B32B 15/08; B32B 15/14; B32B 27/28; B32B 27/30; B32B 27/32; B32B 27/34; B32B 27/36; B32B 27/38; B32B 27/40; B32B 2262/0253; B32B 2262/106; B32B 2307/54
See application file for complete search history.

(56) References Cited

U.S. PATENT DOCUMENTS

| | | | | |
|---|---|---|---|---|
| 5,366,631 | A * | 11/1994 | Adiletta | B01D 39/163 210/490 |
| 5,679,042 | A | 10/1997 | Varona | |
| 7,051,883 | B2 | 5/2006 | Angelini et al. | |
| 7,476,636 | B2 | 1/2009 | Kulkarni et al. | |
| 2009/0123767 | A1* | 5/2009 | Gohil | B32B 27/10 428/458 |
| 2009/0286308 | A1 | 11/2009 | Berthelot et al. | |
| 2010/0096181 | A1* | 4/2010 | Nakamura | B32B 7/02 174/394 |
| 2010/0098877 | A1 | 4/2010 | Cooper et al. | |
| 2010/0108605 | A1 | 5/2010 | Patil et al. | |
| 2010/0327847 | A1 | 12/2010 | Leiber et al. | |
| 2011/0014457 | A1* | 1/2011 | Quitoriano | B82Y 30/00 428/336 |
| 2011/0114558 | A1 | 5/2011 | Al-Mayahi et al. | |
| 2011/0114573 | A1 | 5/2011 | Simpson et al. | |
| 2011/0217544 | A1 | 9/2011 | Young et al. | |
| 2012/0000845 | A1* | 1/2012 | Park | B01D 67/0041 210/500.25 |
| 2012/0228556 | A1 | 9/2012 | Roundhill et al. | |
| 2012/0241391 | A1 | 9/2012 | Carlson et al. | |
| 2012/0255899 | A1 | 10/2012 | Choi et al. | |
| 2012/0286234 | A1 | 11/2012 | Yager | |

OTHER PUBLICATIONS

Favre, "Carbon dioxide recovery process from post-combustion processes: Can gas permeation membranes compete with absorption?", Journal of Membrane Science 294 (2007) 50-59, Feb. 9, 2007.
Electron microscope picture of a porous membrane, showing supporting layers and a selective hybrid silica top layer (thickness: 0.1 μm; pore size: few Ångströms); http://www.utwente.nl/tnw/im/introduction/introduction.docx/introduction-1.png, May 2006.
Lee et al., "Measurement of the Elastic Properties and Intrinsic Strength of Monolayer Graphene", Science, Jul. 18, 2008: vol. 321 No. 5887, pp. 385-388.
Li et al., "Tanser of Large-Area Graphene Films for High-Performance Transparent Conductive Electrodes", NANO Letters 2009 vol. 9, No. 12 4359-4363, Sep. 18, 2009.
Regan et al., "A direct transfer of layer-area grapheme", Appl. Phys. Letters 96, 113102; Mar. 15, 2010.
Gregor, "Primer on Nonwoven Fabric Filtration Media"; http://www.egregor.com/whitepapers/NONWOVEN%20PRIMER.pdf; © 2003 Edward C. Gregor & Associates, LLC, printed on May 7, 2013.
Gregor, "Primer on Membrane Filtration"; http://www.egregor.com/whitepapers/MembrPrimEG.pdf; Edward C. Gregor & Associates, LLC, Charlotte, NC, Oct. 2011.
Simmonds et al., "Designing Nonwovens to Meet Pore Size Specifications"; http://www.jeffjournal.org/papers/Volume2/Simmonds.pdf; Journal of Engineered Fibers and Fabrics, vol. 2, Jan. 2007.
Palmeira, et al., "Drainage and filtration properties of non-woven geotextiles under confinement using different experimental techniques, Geotextiles and Geomembranes", vol. 20, Issue 2, Apr. 2002, pp. 97-115.
"Nonwoven Polyprophlene Geotextile"; http://cms.esi.info/Media/documents/Geosy_Fibertex_ML.pdf, Fibertex, Jun. 2007.
Lee et al., "Wafer-Scale Synthesis and Transfer of Graphene Films", Nano Letters, 10, 490-493, Jan. 4, 2010.
Bunch et al., Impermeable Atomic Membranes from Graphene Sheets, Nano Letters, vol. 8, No. 8, Jun. 12, 2008.
Car, A., et al., "Tailor-made Polymeric Membranes based on Segmented Block Copolymers for CO2 Separation," Advanced Functional Materials, vol. 18, Issue 18, pp. 2815-2823 (Sep. 23, 2008).
International Search Report and Written Opinion for International Application No. PCT/US2012/067467, mailed on Feb. 7, 2013, pp. 10.
Jiang, D-E., et al., "Porous graphene as the ultimate membrane for gas separation," Nano Letters, vol. 9, Issue 12, pp. 4019-4024 (Sep. 23, 2009).
Lin, H. and Freeman. B.D., "Materials selection guidelines for membranes that remove CO2 from gas mixtures," Journal of Molecular Structure, vol. 739, Issues 1-3, pp. 57-74 (Apr. 4, 2005).
Pinnau, I., and Freeman, B. D., "Formation and Modification of Polymeric Membranes: Overview," in Membrane Formation and Modification, ACS Symposium Series, Chapter 1, vol. 744, pp. 1-22 (Dec. 29, 1999).

* cited by examiner

GRAPHENE MEMBRANE LAMINATED TO POROUS WOVEN OR NONWOVEN SUPPORT

CROSS-REFERENCE TO RELATED APPLICATION

This Application is the U.S. National Stage filing under 35 U.S.C. §371 of PCT Application Ser. No. PCT/US2012/067458 filed on Nov. 30, 2012. The disclosure of the PCT Application is hereby incorporated by reference in its entirety.

BACKGROUND

Unless otherwise indicated herein, the materials described in this section are not prior art to the claims in this application and are not admitted to be prior art by inclusion in this section.

An example composite membrane may include a thin active (selectively permeable) layer, e.g., porous graphene, on a porous (broadly permeable) membrane support. Composite membranes may be prepared with thin active layers, for example, ranging from about 500 angstroms to about 1 micrometers—as thin as possible, since resistance to gas or fluid flow may scale linearly with membrane thickness. Such thin films may generally be fragile when handled in isolation, so composite membranes are often formed by casting the active layer from solution directly on the support.

High quality monolayer graphene is generally insoluble and may be difficult to cast evenly onto a substrate from solution. Instead, mechanical transfer techniques may be employed to transport graphene from a growth substrate (for example, copper or nickel) onto a porous membrane support. However, adhering the graphene to the porous substrate may be difficult because the graphene sheet may be suspended over the pore voids and not in contact with the porous membrane support material. This challenge may be magnified since bare, nonpolar graphene may bond to the support through just van der Waals forces. Good adhesion of the graphene to the support may be critical to permit handling of the membranes during manufacturing and to ensure reliability in use.

Further, it may be desirable that any given membrane material may sustain the transmembrane pressure occurring during separation. This transmembrane pressure may range, for example, from one atmosphere for $CO_2$ scrubbing in coal plants, up to 100 or more atmospheres for natural gas sweetening or reverse osmosis. This transmembrane pressure may deform the active layer of the membrane into the pores of the support, by which the membrane may be subjected to significant tensile stress.

With larger pore size and/or higher pressure, the active region of the membrane may burst, damaging the membrane's separation properties. However, the incorporation of a membrane support with small pores may restrict the flow of fluid substantially, and may limit the total overall separation flux through the composite membrane. It may be desirable to employ a membrane support with pore sizes as large as possible to avoid unnecessarily restricting flow. An example of a common support is polysulfone with nano or micro scale pores, since it has tensile strength useful for good mechanical support, and may be formulated with fairly uniform pore sizes. However, supports may be quite expensive: at roughly $50/m$^2$, polysulfone may be the greatest cost component of a composite membrane which may limit membrane applications. In particular, graphene monolayers at one atomic layer thick may add little cost while providing permeabilities that greatly outstrip the best existing polymeric membranes today. In graphene composite membranes, even polysulfone supports may undesirably restrict flow and/or raise cost.

The present disclosure appreciates that preparing composite membranes including porous graphene layers, e.g., for use in separations, may be a complex undertaking.

SUMMARY

The following summary is illustrative only and is not intended to be in any way limiting. In addition to the illustrative aspects, embodiments, and features described above, further aspects, embodiments, and features will become apparent by reference to the drawings and the following detailed description.

The present disclosure generally describes composite membranes and methods, apparatus, and computer program products for preparing and using composite membranes.

In various examples, composite membranes are described. The composite membranes may include a porous graphene layer and a porous support substrate that may include a surface configured in contact with the porous graphene layer. The surface of the porous support substrate may include at least one of: a thermo-formed polymer characterized by a glass transition temperature, a woven fibrous membrane, and/or a nonwoven fibrous membrane.

In various examples, methods of preparing composite membranes are described. The methods may include contacting a second surface of a porous graphene layer to a first surface of an adherent polymer. In several examples, a first surface of the porous graphene layer may be configured in contact with a growth substrate. The example methods may also include removing the porous graphene layer together with the adherent polymer from the growth substrate. The example methods may further include contacting the first surface or the second surface of the porous graphene layer to a surface of a porous support substrate to form the composite membrane. In several examples, the surface of the porous support substrate may include at least one of: the first surface of the adherent polymer, a thermo-formable polymer characterized by a glass transition temperature, a woven fibrous membrane, and/or a nonwoven fibrous membrane.

In various examples, systems for manufacturing composite membranes are described. The systems may include one or more of: an adherent polymer source; a polymer film manipulator; a porous support source; and/or a controller. In several examples, the controller may be coupled to one or more of the adherent polymer source, the polymer film manipulator, and/or the porous support source. In some examples, the controller may be configured by machine-executable instructions. Instructions may be included to control the adherent polymer source and the sample manipulator effective to contact a first surface of an adherent polymer to a second surface of a porous graphene layer. The porous graphene layer may have a first surface that contacts a growth substrate. Instructions may be included to control the polymer film manipulator effective to remove the porous graphene layer together with the adherent polymer from the growth substrate. Instructions may be included to control the porous support source effective to provide a porous support substrate. Instructions may further be included to control the polymer film manipulator effective to contact the first surface or the second surface of the porous graphene layer to a surface of the porous support substrate to form the composite membrane. The surface of the porous support substrate may include at least one of: the first surface of the adherent polymer, a thermo-formable polymer characterized by a glass transition temperature, a woven fibrous membrane, or a nonwoven fibrous membrane.

In various examples, computer-readable storage media are described having instructions stored thereon for manufacturing composite membranes. Instructions may be included to control a sample manipulator effective to position a growth substrate. In several examples, the growth substrate may support a porous graphene layer that has a first surface that contacts the growth substrate. Instructions may be included effective to control an adherent polymer source and the sample manipulator to contact a second surface of the porous graphene layer to a first surface of an adherent polymer. Instructions may also be included to control a porous support source effective to provide a porous support substrate. Instructions may further be included to control a polymer film manipulator effective to remove the porous graphene layer together with the adherent polymer from the growth substrate. Instructions may also be included to control the polymer film manipulator effective to contact the first surface or the second surface of the porous graphene layer to a surface of the porous support substrate to form the composite membrane. The surface of the porous support substrate may include at least one of: the first surface of the adherent polymer, a thermo-formable polymer characterized by a glass transition temperature, a woven fibrous membrane, and/or a nonwoven fibrous membrane.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments arranged in accordance with the disclosure and are, therefore, not to be considered limiting of its scope, the disclosure will be described with additional specificity and detail through use of the accompanying drawings, in which:

DETAILED DESCRIPTION

Figure 1:
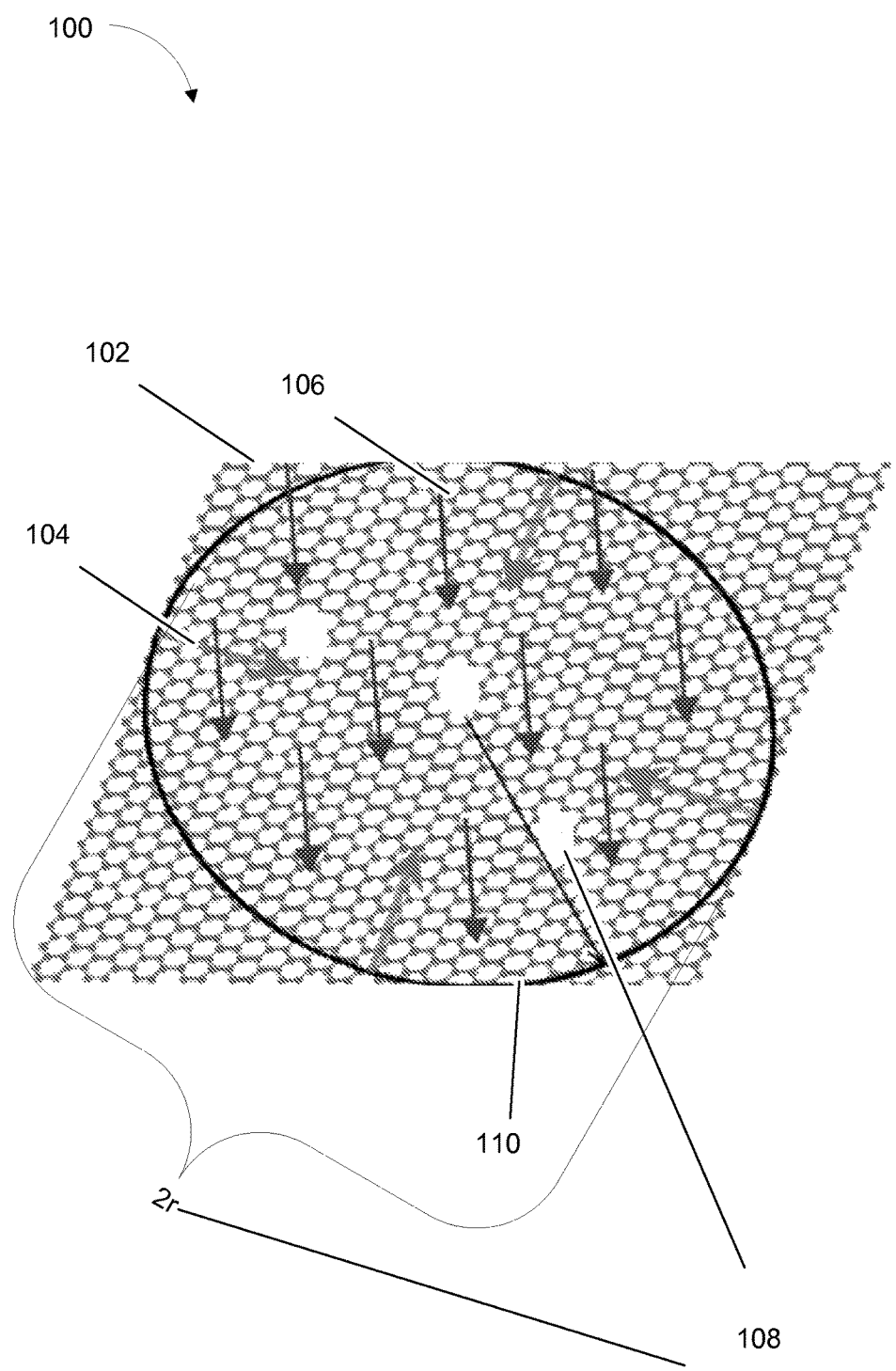
FIG. 1 is a conceptual perspective view of pressure acting on a porous graphene layer usable with example composite membranes.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Briefly described, composite membranes may include a porous graphene layer in contact with a porous support substrate. In various examples, a surface of the porous support substrate may include at least one of: a thermo-formed polymer characterized by a glass transition temperature, a woven fibrous membrane, and/or a nonwoven fibrous membrane. Examples of the composite membranes permit the use of highly porous woven or nonwoven fibrous support membranes instead of intermediate porous membrane supports. In several examples, the composite membranes may include porous graphene layers directly laminated onto the fibrous membranes via the thermo-formed polymers. The described composite membranes may be useful for separations, for example, of gases, liquids and solutions.

FIG. 1 is a conceptual perspective view of pressure acting on a porous graphene layer usable with example composite membranes, arranged in accordance with at least some embodiments described herein. FIG. 1 shows a porous graphene layer 102. In some examples, the porous graphene layer 102 may include between about 1 and about 10 monolayers of graphene. In several examples, the porous graphene layer 102 may be a porous graphene monolayer. A substantially circular area 110, corresponding to a pore in an underlying porous support, may be characterized by a radius r 108 or diameter 2 r. The pressure P may be represented by arrows 106 and corresponds to a force F, represented by arrows 104.

The pressure P 106 on the area 110 leads to a force F 104 and calculated by pressure times area, $F=P\pi r^2$. The pressure P 106 and the corresponding force F 104 may be sufficient to rupture the porous graphene layer 102 when the force F 104 divided by the circumference of area 110 reaches or exceeds the maximum tensile strength of graphene, $T_{max}$, e.g., $(P\pi r^2)/2\pi r = Pr/2 = T_{max}$. The tensile strength of graphene, $T_{max}$, has been reported as about 130 gigaPascals, which corresponds to a breaking strength of about 42 N/m at an effective graphene monolayer thickness of about 0.323 nm. The maximum pressure sustainable by the porous graphene layer 102 may be represented by $P_{max}=2T_{max}/r$.

Figure 2:
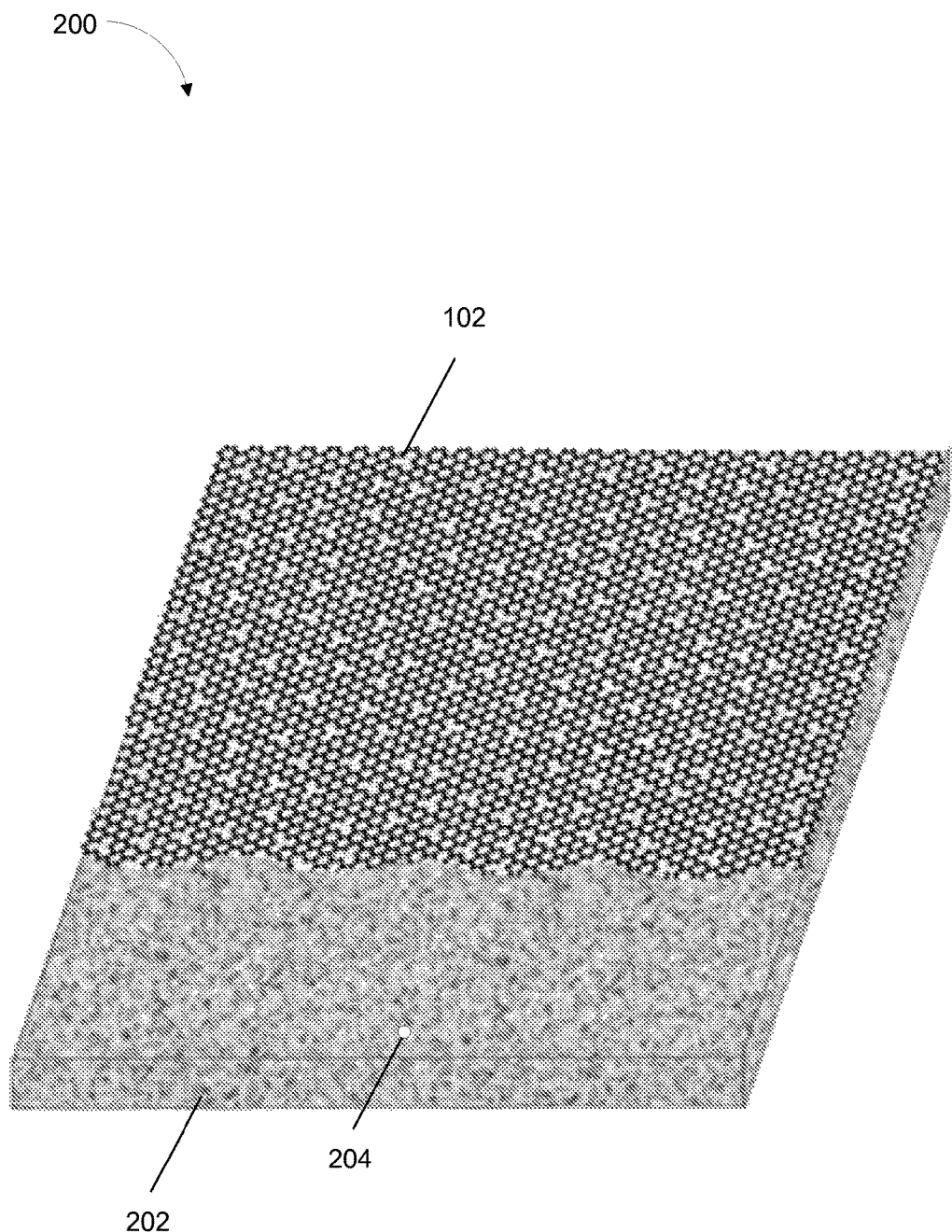
FIG. 2 is a conceptual illustration representative of example composite membranes.

FIG. 2 is a conceptual illustration representative of example composite membranes, arranged in accordance with at least some embodiments described herein. FIG. 2 shows a porous graphene layer 102 on a porous support substrate 202. Surprisingly, it was found that the $T_{max}$ of graphene is large enough that the porous graphene layer 102 may be placed directly onto the porous support substrate 202 with porous support substrate pores 204 of a wide range of sizes, provided the pores 204 in the porous support substrate 202 have a radius $r_{max}$ less than about twice the maximum tensile strength divided by the maximum pressure, e.g., $2T_{max}/P_{max}$.

For example, a pressure of 10 atmospheres (1.01 megaPascals) on a porous graphene layer 102 may correspond to a maximum pore diameter for the porous support substrate 202 of about 165 micrometers. Commercially available polysulfone membrane supports (e.g., Pall Corp.) may be cast with pore sizes from hundreds of nanometers in diameter to about 5 microns in diameter, pore sizes far smaller than pores 204 which porous graphene layer 102 may tolerate. Woven and non-woven fibrous materials for porous support substrate 202 are commercially available with pore sizes of about 5 micrometers and greater (e.g., Hanes Industries). Woven and non-woven fibrous porous support materials may be suitable porous support substrates 202 for single layer graphene membranes 200. Surprisingly, a conventional polymer support such as nanoporous polysulfone may be omitted entirely in favor of a woven or nonwoven fibrous porous support substrate 202, greatly simplifying the described composite membranes and improving membrane throughput. In various examples, suitable fibrous porous support substrates 202 may be comparatively inexpensive. In some examples, suitable fibrous porous support substrates 202 may be between about 30 and about 300 times cheaper than present nanoporous polymer membrane supports such as nanoporous polysulfone. In various examples, the fibrous porous support substrate 202 may be selected such that the maximum pore size of the fibrous porous support substrate 202 is less than radius $r_{max}$. This maximum pore size is different from the average pore size, especially for non-woven porous support materials as described below.

Figure 3:
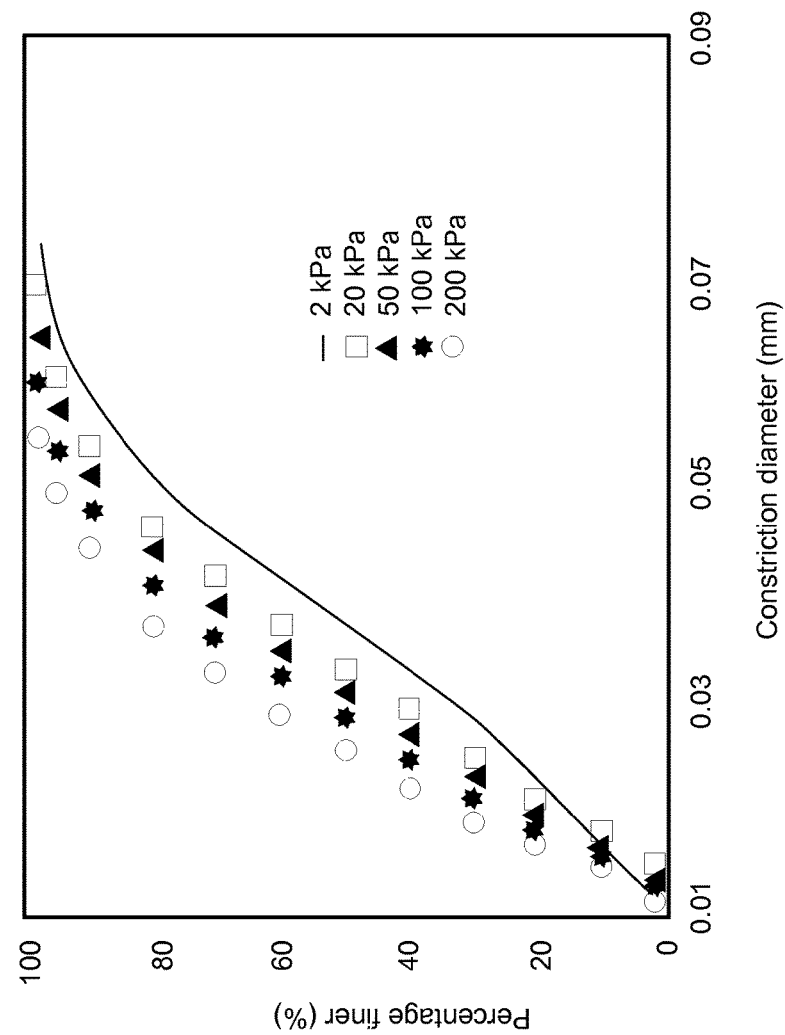
FIG. 3 is a graph representative of distributions of pore sizes in nonwoven fibrous membranes usable with example composite membranes.

FIG. 3 is a graph 300 representative of distributions of pore sizes in nonwoven fibrous membranes usable with example composite membranes, arranged in accordance with at least some embodiments described herein. FIG. 3 shows an analysis of pore size distribution in a nonwoven geotextile, where the maximum pore size in a range of about 50 to about 60 micrometers, which is roughly twice as large as a mean pore size in a range of about 20 to about 25 micrometers. FIG. 3 also shows that increasing pressure may tend to constrict the effective pore size of the fibrous porous support material as compared to the same fibrous porous support material without the applied pressure. Among commercially available non-woven porous support materials, maximum pore size tends to be in a range roughly from about 50% to about 100% larger than the mean pore size, with some variation depending on the technique of manufacture.

Average pore size and distribution may be selected by choosing an appropriate commercially available woven or nonwoven fibrous material. Average pore size and distribution may also be controlled by selecting the appropriate fiber and manufacturing process. In various examples, finer fibers of about 1 to about 2 denier may be employed to maintain the pore size as small and tightly as possible. Example fibers may include, for example, commercially available 1.2-1.7 denier fibers (e.g., T-191 polypropylene fibers, FIBERVISIONS® Covington, Ga.). By using fine denier fibers, low cost nonwovens may be produced with pore sizes as low as about 3 to about 20 micrometers. With pore sizes as low as about 3 to about 20 micrometers, the described composite membranes may be useful for porous graphene layers 102 even at high transmembrane pressures.

A suitable non-woven porous support substrate 202 for a given working pressure may be selected by setting the weave fine enough that the number of pores in the fabric that exceed the maximum diameter may be negligibly small. For example, a maximum support-pore size of about 70 micrometers may be selected as a suitable conservative value for about 10 atmospheres of transmembrane pressure. Assuming a standard normal distribution and assuming sigma equals one half the average pore size, about one in one billion pores may exceed about 70 micrometers for a non-woven fabric with an average pore size of about 18 micrometers. Using the same assumptions, about one in one trillion pores may exceed about 70 micrometers for a non-woven fabric with an average pore size of about 16 micrometers.

The flux through fine-pitch non-woven porous support substrates 202 may be increased further without sacrificing selectivity by a process known as "needle punching," which may be used to create uniform microscopic pores at the size appropriate to the separation pressure. Needle punching may generate regular maximum pores sizes of about 60 to 70 micrometers and larger. This size lies within the range which may be suitable for supporting porous graphene layers 102 at separation pressures of about 10 atmospheres.

Depending on desired use for the composite membranes 200, the composite membranes 200 may be packaged in a configuration that includes additional mechanical support, for example a spiral-wound membrane configuration, a dual-metal mesh sandwich, or the like. Suitable dimensions for a mechanical support scaffold (e.g., stainless steel mesh) may be selected based on the non-woven or needle-punched fabric used for the porous support substrate 202. For example, the tensile strength of commercially available fibrous porous support materials varies from about 5 kiloNewtons/meter to about 10 kiloNewtons/meter. For an example working pressure of about 10 atmospheres, this corresponds to a wire grid support with wire to wire spacing of about 2 centimeters.

Figure 4:
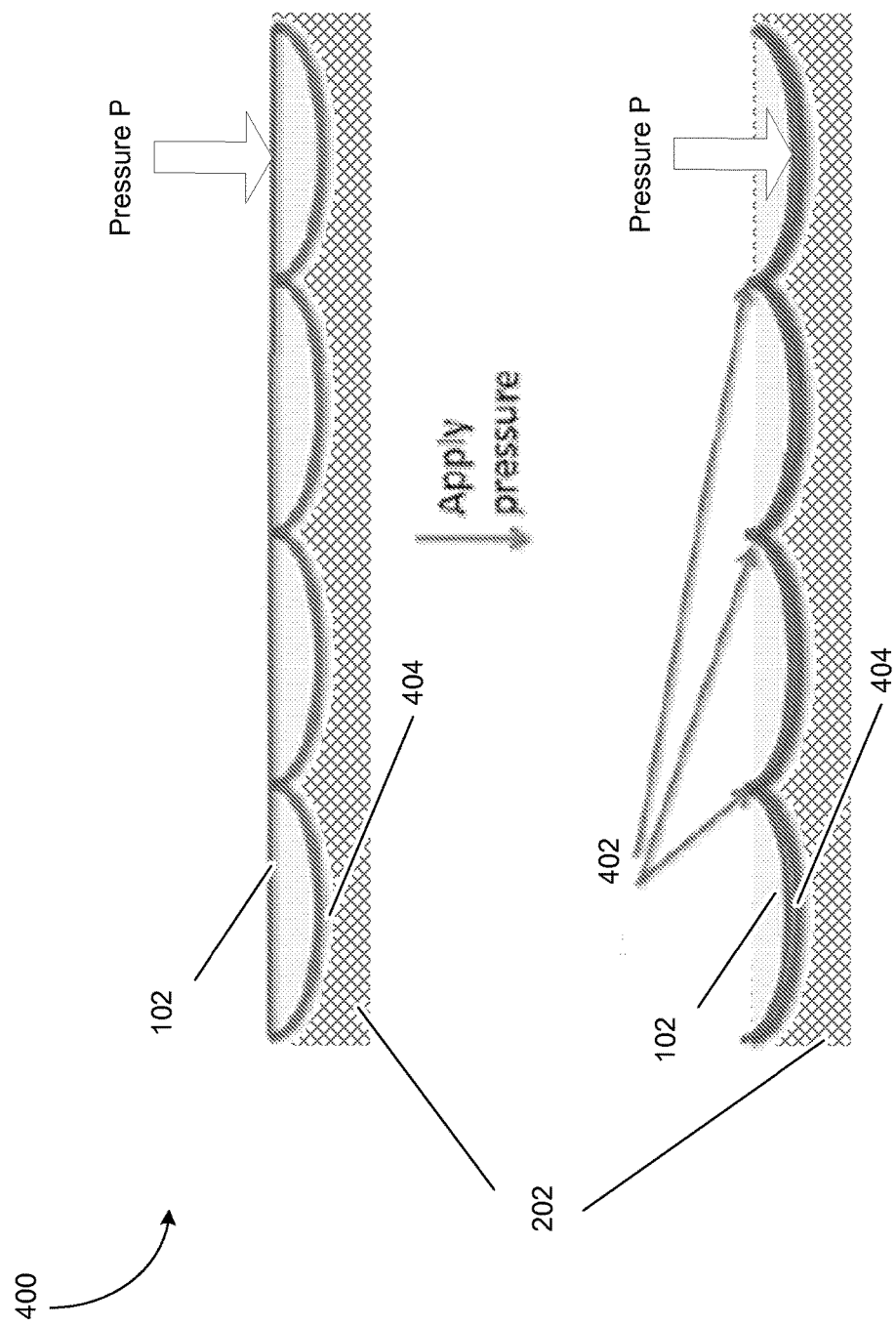
FIG. 4 is a conceptual side view representative of pressure acting on porous graphene layers usable with the example composite membranes.

FIG. 4 is a conceptual side view 400 representative of pressure acting on porous graphene layers usable with the example composite membranes, arranged in accordance with at least some embodiments described herein. In FIG. 4, the porous graphene layer 102 at rest may contact pores 204 of porous support substrate 202 at pore borders 402.

The adhesion due to van der Waals forces between the porous graphene layer 102 and the porous support substrate 202 may be quite strong per unit area of actual contact, in part because graphene may be highly polarizable and the strength of van der Waals attraction may scale with polarizability. The van der Waals forces alone have been demonstrated to be sufficient to physically anchor an impermeable graphene sheet to a flat support substrate when subjected to several atmospheres of (reverse) transmembrane pressure—despite the strong forces involved, no sliding of the membrane was found. However, contact between the porous graphene layer 102 and the porous support substrate 202 at pore borders 402 may be insufficient to provide desired adhesion between the porous graphene layer 102 and porous support substrate 202 because the total contact area represented by at pore borders 402 may be small compared to the total area of the porous graphene layer 102.

The porous graphene layer 102 may be adhered to a porous support substrate 202 by deforming the microscopic surface of the porous support substrate 202 and/or the porous graphene layer 102 to mutually conform, thereby maximizing physical contact between the two layers. For example, the porous support substrate 202 may include a deformable interface 404. The deformable interface 404 may include an adherent polymer, such as a pressure sensitive adhesive or a thermoplastic material characterized by a glass transition temperature. The porous support substrate 202 may be pressed directly against supported porous graphene layer 102 using pressure or a pressurized thermoforming process above the glass transition temperature, such as hot calendaring. The surface of the deformable interface 404 included with the porous support substrate 202 may soften or flow under pressure and/or heating to the glass transition temperature and may be pressed against the porous graphene layer 102. Surface contact may be increased between the porous graphene layer 102 and the porous support substrate 202. In some examples, surface contact may be increased between the porous graphene layer 102 and the porous support substrate 202 without occluding the pores of the porous graphene layer 102 and/or the porous support substrate 202. The porous graphene layer 102 may remain permeable yet anchored to the porous support substrate 202.

Another procedure for bonding a thermoplastic version of the porous support substrate 202 to the porous graphene layer 102 may include: preparing graphene via chemical vapor deposition on a copper or nickel substrate; etching the graphene to form the porous graphene layer 102; bonding the thermoplastic version of the porous support substrate 202 the porous graphene layer 102 using pressure and temperature; and etching away the copper or nickel substrate to reveal the composite membrane 200.

Another procedure for bonding a thermoplastic version of the porous support substrate 202 to the porous graphene layer 102 may include one or more of: preparing graphene via chemical vapor deposition on a copper or nickel substrate; etching the graphene to form the porous graphene layer 102; coating the porous graphene layer 102 with a transfer film of a polymer such as polycarbonate or polysulfone; etching away the copper or nickel substrate to leave the porous graphene layer 102 bonded to the transfer film; laminating the porous graphene layer 102/to the porous support substrate 202 using pressure and/or heat; and removing the transfer film with a solvent such as acetone to provide the composite membrane 200.

Figure 5:
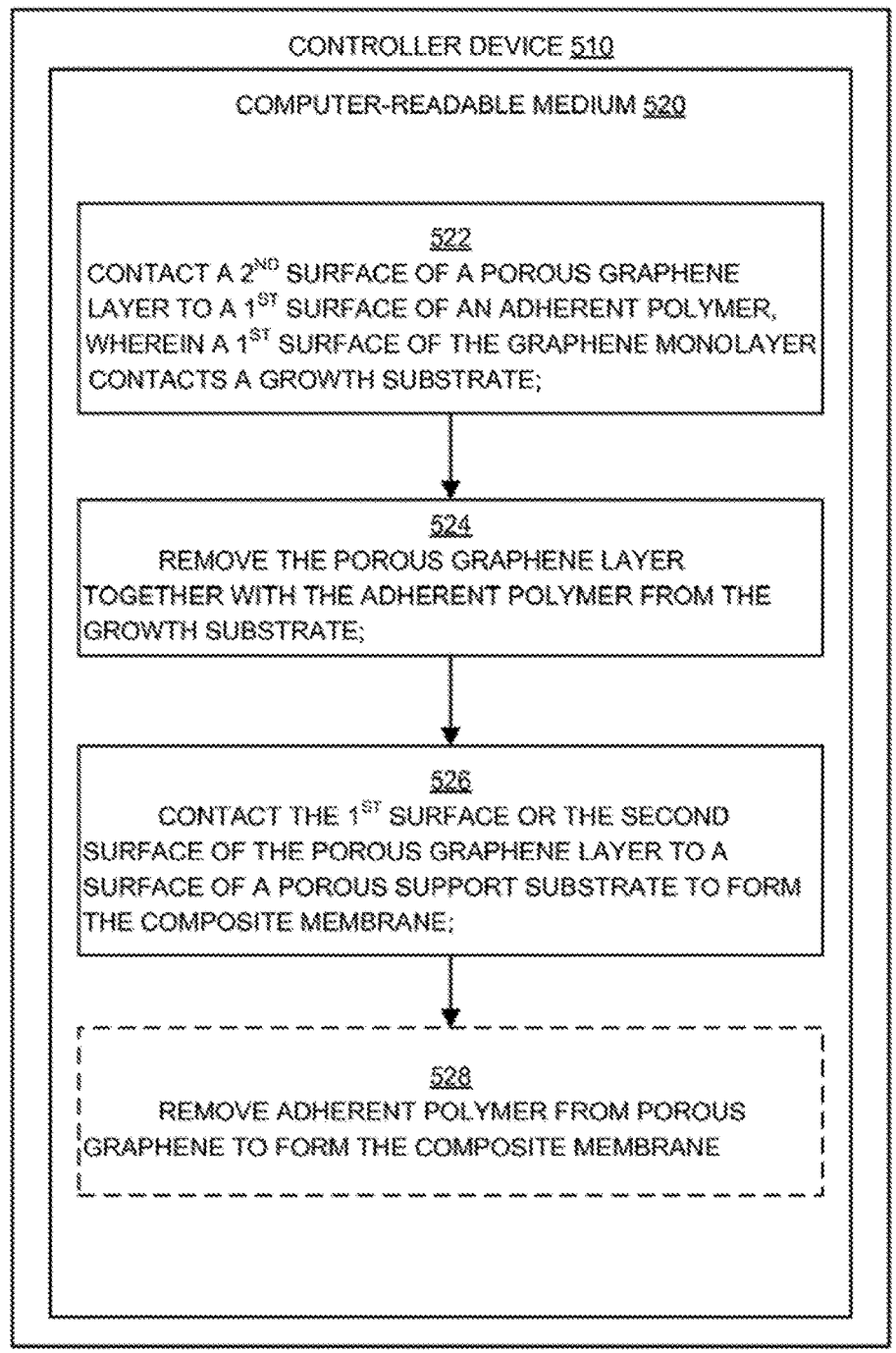
FIG. 5 is a flow diagram showing example operations that may be used in carrying out the described methods of forming composite membranes.

FIG. 5 is a flow diagram showing example operations that may be used in carrying out the described methods of forming composite membranes, arranged in accordance with at least some embodiments described herein. A process of manufacturing the composite membranes as described herein may include one or more operations, functions or actions as may be illustrated by one or more of operations 522, 524, and/or 526. Various example methods of manufacturing the composite membranes as described herein may be operated by a controller device 510, which may be embodied as computing device 700 in FIG. 7 or a special purpose controller such as manufacturing controller 690 of FIG. 6, or similar devices configured to execute instructions stored in computer-readable medium 520 for controlling the performance of the methods.

Some example processes may begin with operation 522 "CONTACT A 2ND SURFACE OF A POROUS GRAPHENE LAYER TO A 1ST SURFACE OF AN ADHERENT POLYMER, WHEREIN A 1ST SURFACE OF THE GRAPHENE MONOLAYER CONTACTS A GROWTH SUBSTRATE." Operation 522 may include one or more of applying pressure and/or heat, such as applied by a lamination machine, a hot calendaring apparatus, or the like. The adherent polymer may be, for example, the porous support substrate 202; the deformable interface 404 on the porous support substrate 202; the transfer film described herein; or a combination thereof.

Operation 522 may be followed by operation 524, "REMOVE THE POROUS GRAPHENE LAYER TOGETHER WITH THE ADHERENT POLYMER FROM THE GROWTH SUBSTRATE." Operation 524 may be conducted by any technique described herein, for example, using one or more of a roll to roll process, a contact lifting process, a contact printing/deposition process, dry stamping, or another suitable process for removing the porous graphene layer 102 together with the first selective membrane.

Operation 524 may be followed by operation 526, "CONTACT THE 1ST SURFACE OR THE SECOND SURFACE OF THE POROUS GRAPHENE LAYER TO A SURFACE OF A POROUS SUPPORT SUBSTRATE TO FORM THE COMPOSITE MEMBRANE." Operations 524 and 526 may be separately or jointly conducted by any technique described herein, for example, using one or more of a roll to roll process, a contact lifting process, a contact printing/deposition process, dry stamping, or another suitable process for moving the porous graphene layer 102 together with the first selective membrane. In the case where the adherent polymer may be the porous support substrate 202; the deformable interface 404 on the porous support substrate 202, operation 526 may be coincident with operation 522. In cases where the adherent polymer is the transfer film, operation 526 may be distinct from operation 522.

Any of operations 522, 524, or 526 may be optionally followed by operation 528, "REMOVE ADHERENT POLYMER FROM POROUS GRAPHENE TO FORM THE COMPOSITE MEMBRANE." Operation 528 may be conducted by any technique described herein, for example, one or more of a roll to roll process, a contact lifting process, a contact printing/deposition process, solvent dissolution, or the like.

The operations included in the process of FIG. 5 described above are for illustration purposes. A process of manufacturing the composite membranes as described herein may include may be implemented by similar processes with fewer or additional operations. In some examples, the operations may be performed in a different order. In some other examples, various operations may be eliminated. In still other examples, various operations may be divided into additional operations, or combined together into fewer operations. Although illustrated as sequentially ordered operations, in some implementations the various operations may be performed in a different order, or in some cases various operations may be performed at substantially the same time. For example, any other similar process may be implemented with fewer, different, or additional operations so long as such similar processes form the composite membranes as described herein.

Figure 6:
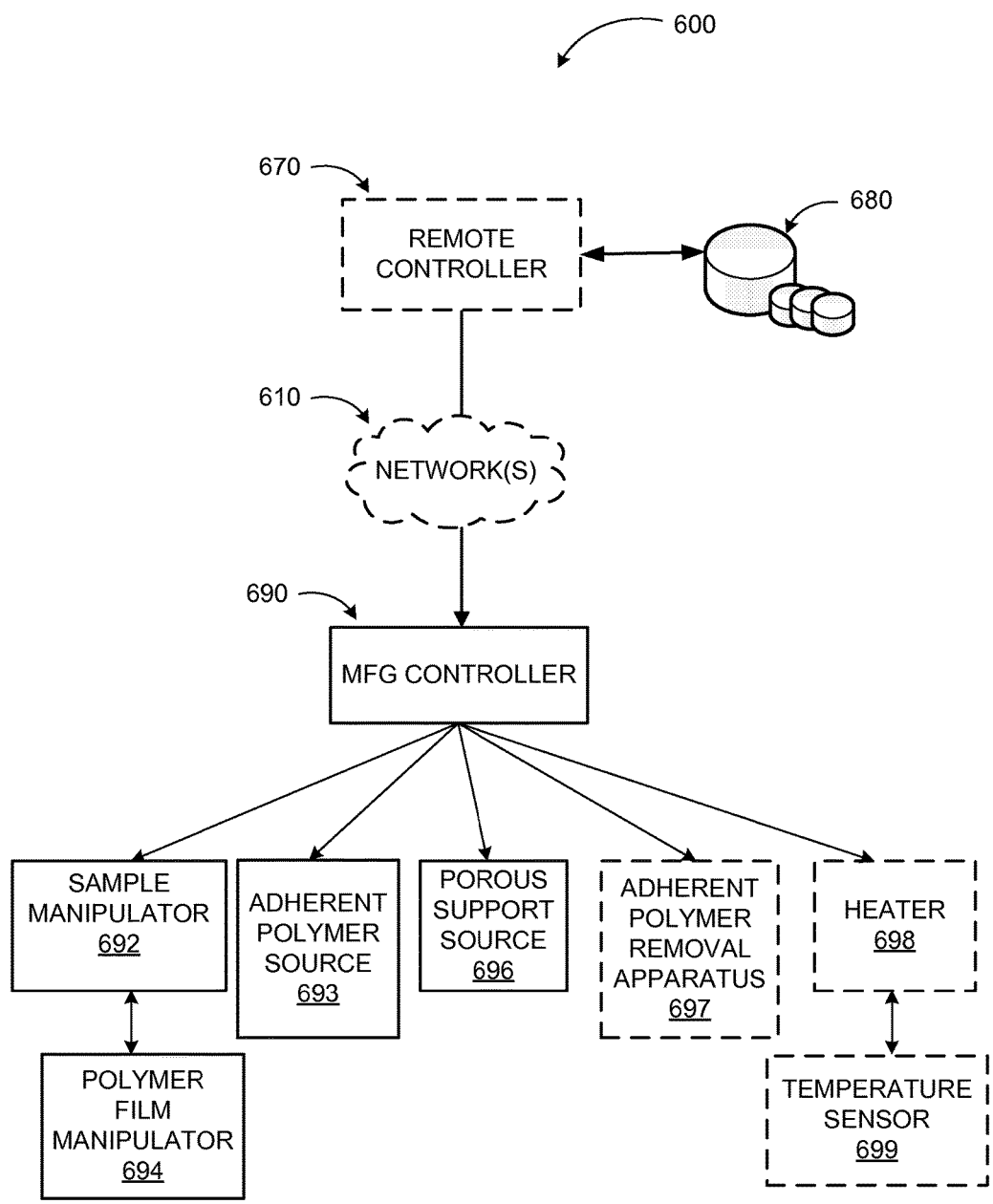
FIG. 6 is a block diagram representative of systems that may be used for carrying out the example methods of forming the composite membranes.

FIG. 6 is a block diagram representative of systems that may be used for carrying out the example methods of forming the composite membranes, arranged in accordance with at least some embodiments described herein. For example, manufacturing system 600 may be operated as described herein using the process operations outlined in FIG. 5.

As illustrated in FIG. 6, a manufacturing controller 690 may be coupled to one or more machines that may be employed to carry out the operations described in FIG. 5, for example, one or more of: a sample manipulator 692; an adherent polymer source 693; a polymer film manipulator 694; a porous support source 696; an adherent polymer removal apparatus 697; a heater 698; a temperature sensor 699; and the manufacturing controller 690.

Manufacturing controller 690 may be operated by human control, by a remote controller 670 via one or more networks 610, or by machine executed instructions such as might be found in a computer program. Data associated with controlling the different processes of manufacturing graphene may be stored at and/or received from data stores 680. Further, the individual elements of manufacturing system 600 may be implemented as any suitable device configured in any suitable fashion for carrying out the operations described herein.

For example, sample manipulator 692 may be stationary or may include one or more moving functions, such as translation in zero, one, two, or 5 perpendicular axes, rotation in one, two, or 5 perpendicular axes, or combinations thereof. Such moving functions may be provided by motors, linear actuators, or piezoelectric actuators. Such moving functions may be provided in combination with moving functions for other elements of manufacturing system 600. For example, either or both of sample manipulator 692 and polymer film manipulator may be moved relative to each other to contact or separate porous graphene layer 102, porous support substrate 202, deformable interface/adherent polymer 404, or the like. Likewise, adherent polymer source 693 may be configured for any technique of contacting an adherent polymer to the porous graphene layer 102 or the porous support substrate 202, such as by spray coating, dip coating, roll coating, or solution deposition. Further, either or both of sample manipulator 692 and polymer film manipulator may be configured for any approach for laminating the porous graphene layer to the porous support substrate 202, such as by pressing or rolling, optionally in conjunction with heating by heater 698 and temperature control provided using temperature sensor 699.

The apparatus elements described above for FIG. 6 are for illustration purposes. An apparatus for forming the described composite membranes as described herein may be implemented by similar apparatus with fewer or additional elements. In some examples, the apparatus elements may be configured locations or in different order. In some other examples, various apparatus elements may be eliminated. In still other examples, various apparatus elements may be divided into additional apparatus elements, or combined together into fewer apparatus elements. Any other similar automated machine may be implemented with fewer, different, or additional apparatus elements so long as such similar automated machines form the described composite membranes.

Figure 7:
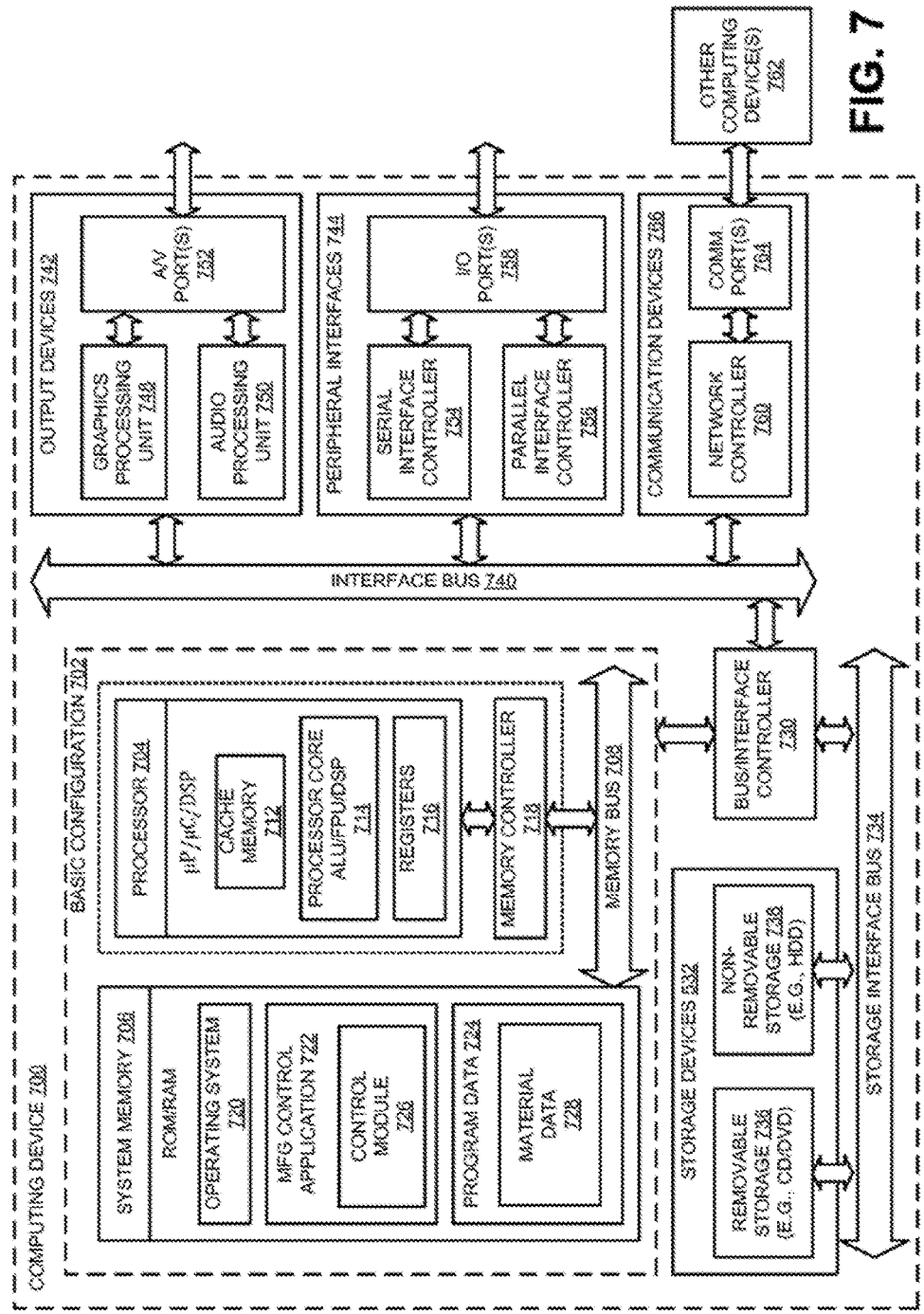
FIG. 7 is a block diagram representative of general purpose computing devices that may be used to control the systems of FIG. 6 or similar equipment in carrying out the example methods of forming the composite membranes.

FIG. 7 is a block diagram representative of general purpose computing devices that may be used to control the systems of FIG. 6 or similar equipment in carrying out the example methods of forming the composite membranes, arranged in accordance with at least some embodiments described herein. In a basic configuration 702, referring to the components within the dashed line, computing device 700 typically may include one or more processors 704 and a system memory 706. A memory bus 708 may be used for communicating between processor 704 and system memory 706.

Depending on the desired configuration, processor 704 may be of any type including but not limited to a microprocessor (μP), a microcontroller (μC), a digital signal processor (DSP), or any combination thereof. Processor 704 may include one more levels of caching, such as a cache memory 712, a processor core 714, and registers 716. Processor core 714 may include an arithmetic logic unit (ALU), a floating point unit (FPU), a digital signal processing core (DSP Core), or any combination thereof. An example memory controller 718 may also be used with processor 704, or in some implementations memory controller 718 may be an internal part of processor 704.

Depending on the desired configuration, system memory 706 may be of any type including but not limited to volatile memory (such as RAM), non-volatile memory (such as ROM, flash memory, etc.) or any combination thereof. System memory 706 may include an operating system 720, one or more manufacturing control applications 722, and program data 724. Manufacturing control application 722 may include a control module 726 that may be arranged to control manufacturing system 600 of FIG. 6 and any other processes, techniques, methods, operations, actions, and functions as discussed above. Program data 724 may include, among other data, material data 728 for controlling various aspects of the manufacturing system 600.

Computing device 700 may have additional features or functionality, and additional interfaces to facilitate communications between basic configuration 702 and any required devices and interfaces. For example, a bus/interface controller 730 may be used to facilitate communications between basic configuration 702 and one or more data storage devices 732 via a storage interface bus 734. Data storage devices 732 may be removable storage devices 736, non-removable storage devices 738, or a combination thereof. Examples of removable storage and non-removable storage devices may include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any technique or technology for storage of information, such as computer readable instructions, data structures, program modules, or other data.

System memory 706, removable storage devices 736 and non-removable storage devices 738 may be examples of computer storage media. Computer storage media may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of computing device 700.

Computing device 700 may also include an interface bus 740 for facilitating communication from various interface devices (e.g., output devices 742, peripheral interfaces 744, and communication devices 766 to basic configuration 702 via bus/interface controller 730. Output devices 742 may include a graphics processing unit 748 and an audio processing unit 750, which may be configured to communicate to various external devices such as a display or speakers via one or more A/V ports 752. Example peripheral interfaces 744 include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. A communication device 766 may include a network controller 760, which may be arranged to facilitate communications with one or more other computing devices 762 over a network communication link via one or more communication ports 764.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 700 may be implemented as a portion of a physical server, virtual server, a computing cloud, or a hybrid device that include any of the above functions. Computing device 700 may also be implemented as a personal computer including both laptop computer and non-laptop computer configurations. Moreover computing device 700 may be implemented as a networked system or as part of a general purpose or specialized server.

Networks for a networked system including computing device 700 may include any topology of servers, clients, switches, routers, modems, Internet service providers, and any appropriate communication media (e.g., wired or wireless communications). A system according to embodiments may have a static or dynamic network topology. The networks may include a secure network such as an enterprise network (e.g., a LAN, WAN, or WLAN), an unsecure network such as a wireless open network (e.g., IEEE 802.11 wireless networks), or a world-wide network such (e.g., the Internet). The networks may also include multiple distinct networks that may be adapted to operate together. Such networks may be configured to provide communication between the nodes described herein. By way of example, and not limitation, these networks may include wireless media such as acoustic, RF, infrared and other wireless media. Furthermore, the networks may be portions of the same network or separate networks.

Figure 8:
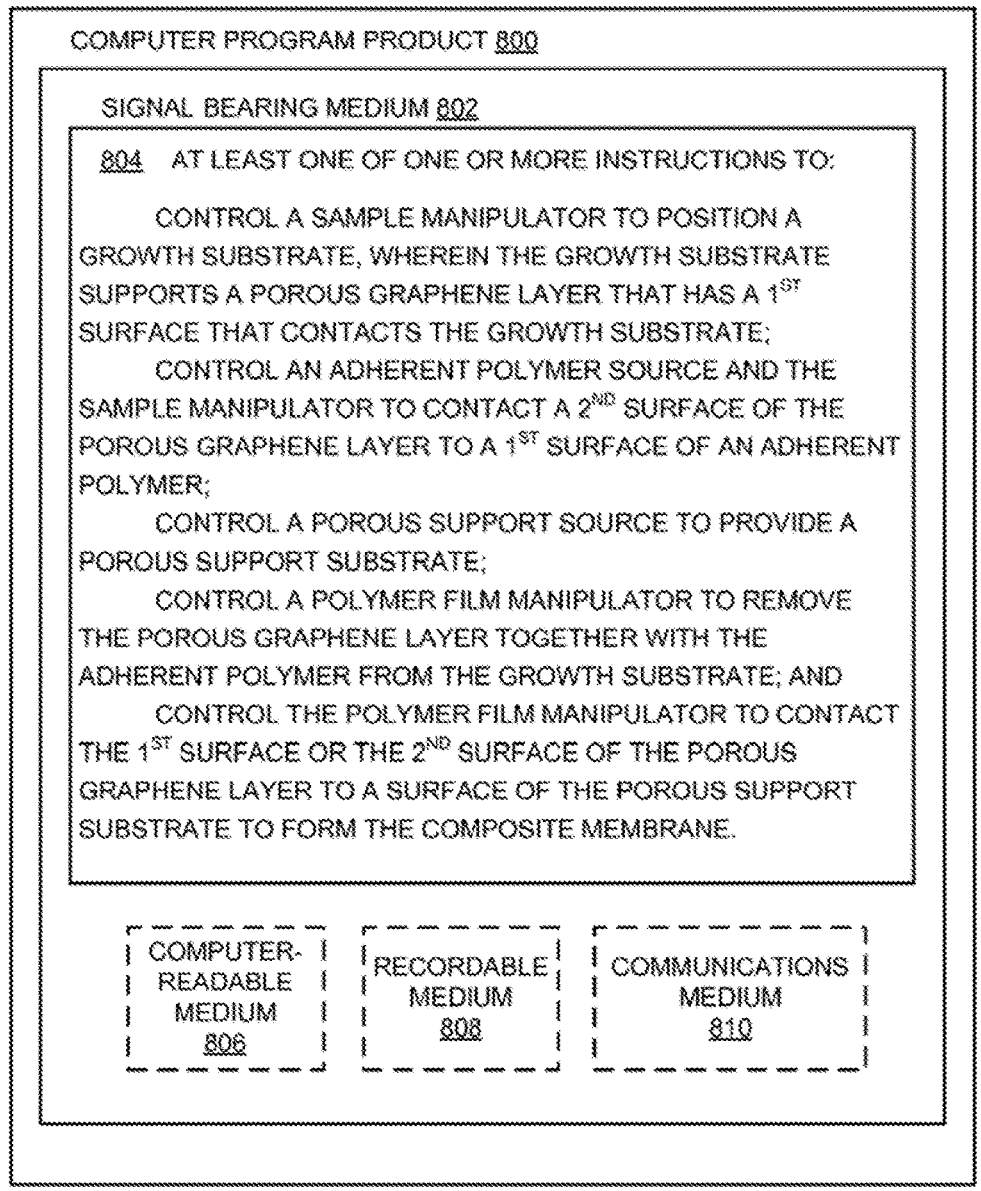
FIG. 8 is a block diagram representative of example computer program products that may be used to control the systems of FIG. 6 or similar equipment in carrying out the example methods of forming the composite membranes, all arranged in accordance with at least some embodiments described herein.

FIG. 8 is a block diagram representative of example computer program products that may be used to control the systems of FIG. 6 or similar equipment in carrying out the example methods of forming the composite membranes, arranged in accordance with at least some embodiments described herein. In some examples, as shown in FIG. 8, computer program product 800 may include a signal bearing medium 802 that may also include machine readable instructions 804 that, when executed by, for example, a processor, may provide the functionality described above with respect to FIG. 5 through FIG. 7. For example, referring to manufacturing controller 690, one or more of the tasks shown in FIG. 8 may be undertaken in response to machine readable instructions 804 conveyed to the manufacturing controller 690 by signal bearing medium 802 to perform actions associated with forming the composite membranes as described herein. Some of those instructions may include, for example, one or more instructions to: "control a sample manipulator to position a growth substrate, wherein the growth substrate supports a porous graphene layer that has a 1st surface that contacts the growth substrate;" "control an adherent polymer source and the sample manipulator to contact a 2nd surface of the porous graphene layer to a 1st surface of an adherent polymer;" "control a porous support source to provide a porous support substrate;" "control a polymer film manipulator to remove the porous graphene layer together with the adherent polymer from the growth substrate;" and "control the polymer film manipulator to contact the 1st surface or the 2nd surface of the porous graphene layer to a surface of the porous support substrate to form the composite membrane."

In some implementations, signal bearing medium 802 depicted in FIG. 8 may encompass a computer-readable medium 806, such as, but not limited to, a hard disk drive (HDD), a Compact Disc (CD), a Digital Versatile Disk (DVD), a digital tape, memory, etc. In some implementations, signal bearing medium 802 may encompass a recordable medium 808, such as, but not limited to, memory, read/write (R/W) CDs, R/W DVDs, etc. In some implementations, signal bearing medium 802 may encompass a communications medium 810, such as, but not limited to, a digital and/or an analog communication medium (e.g., a fiber optic cable, a waveguide, a wired communications link, a wireless communication link, etc.). For example, computer program product 800 may be conveyed to the processor 704 by an RF signal bearing medium 802, where the signal bearing medium 802 may be conveyed by a communications medium 810 (e.g., a wireless communications medium conforming with the IEEE 802.11 standard). While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks may be performed by remote processing devices that may be linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that may include instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for providing a configuration environment, which may facilitate configuration of software/hardware products and services for a variety of purposes. Examples of platforms include, but are not limited to, a hosted service executed over multiple servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is described below.

Example 1: The porous support substrate 202 may be contacted directly to the porous graphene layer 102 on a growth substrate and bonded in place at a temperature above the glass transition temperature of the porous support substrate 202. The porous support substrate 202 may be a thermoplastic such as polypropylene or polyester. The thermoplastic porous support substrate 202 may be bonded to the porous graphene layer 102 by heating past the glass transition temperature, e.g., a range from about 100° C. to about 250° C. for most thermoplastics of interest. Pressure may also be applied so the fibers of the porous support substrate 202 may contact more of the porous graphene layer 102.

Example 2: The porous support substrate 202 may be made of a nonwoven mat of about 1.2 to about 1.7 denier polypropylene fibers (T-191, FIBERVISIONS®, Covington, Ga.). A heated rolling process known as hot calendaring may be performed at about 150° C. to thermally bond the fibers to the porous graphene layer 102. The heat may be applied from a smooth metal roller on the porous graphene layer side of the composite.

Example 3: The porous support substrate 202 may be sprayed or rolled with a thin (less than about 1 micrometer) layer of tacky contact adhesive (e.g., 3M™ FASTBOND™ Cylinder Spray Contact Adhesive 30NF, 3M, St. Paul, Minn.). The adhesive layer may be thin enough to avoid much occlusion of the pores of the porous support substrate 202. The adhesive layer may also be thick and tacky enough to provide conformal contact and van der Waals bonding between the porous graphene layer 102 and the porous support substrate 202. To avoid much occlusion of the pores of the porous graphene layer 102, the adhesive may be sprayed onto the porous support substrate 202. By spraying the adhesive on the porous support substrate 202, the porous graphene layer 102 pores may be occluded only where overlaid with substrate fibers, which may leave the majority of the pores in the porous graphene layer 102 untouched. Bonding in this Example may be accomplished at room temperature using a rolling or compressing process.

In various examples, composite membranes are described. The composite membranes may include a porous graphene layer and a porous support substrate that may include a surface configured in contact with the porous graphene layer. The surface of the porous support substrate may include at least one of: a thermo-formed polymer characterized by a glass transition temperature, a woven fibrous membrane, and/or a nonwoven fibrous membrane.

In some examples of the composite membranes, the surface of the porous support substrate may include one or more of: an acrylonitrile-butadiene-styrene, an allyl resin, a carbon fiber, a cellulosic resin, an epoxy, a polyalkylene vinyl alcohol, a fluoropolymer, a melamine formaldehyde resin, a phenol-formaldehyde resin, a polyacetal, a polyacrylate, a polyacrylonitrile, a polyacrylonitrile, a polyalkylene, a polyalkylene carbamate, a polyalkylene oxide, a polyalkylene sulphide, a polyalkylene terephthalate, a polyalkyl alkylacrylate, a polyalkyleneamide, a halopolyalkylene, a polyamide, a polyamide-imide, a polyarylene isophthalamide, a polyarylene oxide, a polyarylene sulfide, a polyaramide, a polyarylene terephthalamide, a polyaryletherketone, a polycarbonate, a polybutadiene, a polyketone, a polyester, a polyetheretherketone, a polyetherimide, a polyethersulfone, a polyimide, a polyphthalamide, a polystyrene, a polysulfone, a polytetrafluoroalkylene, a polyurethane, a polyvinyl alkyl ether, a polyvinylhalide, a polyvinylidene halide, a silicone polymer, or a combination or a copolymer thereof.

In several examples of the composite membranes, the thermo-formed polymer may include a distribution of pores that may be characterized by an average pore diameter in a range between about 5 nanometers and about 25 micrometers. The thermo-formed polymer may correspond to the woven fibrous membrane or the nonwoven fibrous membrane. The woven fibrous membrane or the nonwoven fibrous membrane may include a distribution of pores that may be characterized by an average pore diameter in a range between about 5 nanometers and about 250 micrometers. The distribution of pores may be characterized in that less than about one pore per billion in the distribution of pores may have a diameter greater than about 4 times the average pore diameter. The woven fibrous membrane or the nonwoven fibrous membrane may be substantially composed of fibers in a range from about 0.1 denier to about 3 denier.

In several examples, the composite membranes may further include at least one additional woven fibrous membrane or nonwoven fibrous membrane configured in contact with the porous support substrate. The porous support substrate may be substantially fibrous. The composite membrane may further include a porous metal support that contacts the porous support substrate and/or the porous graphene layer, where the porous metal substrate may include one or more of: a metal mesh, a metal screen, a metal grid, a perforated metal layer, or a spiral bound mesh.

In various examples, methods of preparing composite membranes are described. The methods may include contacting a second surface of a porous graphene layer to a first surface of an adherent polymer. A first surface of the porous graphene layer may be configured in contact with the growth substrate. The methods may also include removing the porous graphene layer together with the adherent polymer from the growth substrate. The methods may further include contacting the first surface or the second surface of the porous graphene layer to a surface of a porous support substrate to form the composite membrane. The surface of the porous support substrate may include at least one of: the first surface of the adherent polymer, a thermo-formable polymer characterized by a glass transition temperature, a woven fibrous membrane, and/or a nonwoven fibrous membrane.

In some examples, the methods may include contacting the surface of the porous support substrate to the first surface of the porous graphene layer or the second surface of the adherent polymer. The methods may also include removing the adherent polymer from the porous graphene layer to form the composite membrane. The methods may further include contacting the surface of the porous support substrate to the first surface of the porous graphene layer. The surface of the porous substrate may include the thermo-formable polymer. The methods may also include heating the first surface of the porous graphene layer and the thermo-formable polymer above the glass transition temperature. The methods may further include heating the porous graphene layer and the adherent polymer above the glass transition temperature while contacting the second surface of the porous graphene layer to the first surface of the adherent polymer. The adherent polymer may correspond to the thermo-formable polymer. The methods may further include forming the first surface of the adherent polymer by coating the adherent polymer onto the woven fibrous membrane or the nonwoven fibrous membrane. The methods may also include heating the porous graphene layer and the adherent polymer above the glass transition temperature while contacting the second surface of the porous graphene layer to the first surface of the adherent polymer, where the adherent polymer may be the woven fibrous membrane or the nonwoven fibrous membrane.

Several examples of the methods may include selecting the surface of the porous support substrate including one or more of: an acrylonitrile-butadiene-styrene, an allyl resin, a carbon fiber, a cellulosic resin, an epoxy, a polyalkylene vinyl alcohol, a fluoropolymer, a melamine formaldehyde resin, a phenol-formaldehyde resin, a polyacetal, a polyacrylate, a polyacrylonitrile, a polyacrylonitrile, a polyalkylene, a polyalkylene carbamate, a polyalkylene oxide, a polyalkylene sulphide, a polyalkylene terephthalate, a polyalkyl alkylacrylate, a polyalkyleneamide, a halopolyalkylene, a polyamide, a polyamide-imide, a polyarylene isophthalamide, a polyarylene oxide, a polyarylene sulfide, a polyaramide, a polyarylene terephthalamide, a polyaryletherketone, a polycarbonate, a polybutadiene, a polyketone, a polyester, a polyetheretherketone, a polyetherimide, a polyethersulfone, a polyimide, a polyphthalamide, a polystyrene, a polysulfone, a polytetrafluoroalkylene, a polyurethane, a polyvinyl alkyl ether, a polyvinylhalide, a polyvinylidene halide, a silicone polymer, or a combination or a copolymer thereof. The method may include selecting the thermo-formable polymer including a distribution of pores that may be characterized by an average pore diameter in a range between about 5 nanometers and about 25 micrometers.

Some examples of the methods may include selecting the woven fibrous membrane or the nonwoven fibrous membrane may include a distribution of pores that may be characterized by an average pore diameter in a range between about 5 nanometers and about 250 micrometers. The method may include selecting the woven fibrous membrane or the nonwoven fibrous membrane with a distribution of pores characterized in that less than about one pore per billion in the distribution of pores has a diameter greater than 4 times the average pore diameter. The method may include selecting the woven fibrous membrane or the nonwoven fibrous membrane substantially including fibers in a range between about 0.1 denier to about 3 denier. The methods may further include contacting the porous support to at least one additional woven fibrous membrane or nonwoven fibrous membrane. The surface of the porous support substrate may include the woven fibrous membrane or the nonwoven fibrous membrane. The methods may further include contacting the porous support substrate and/or the porous graphene to a porous metal support, where the porous metal substrate may include one or more of: a metal mesh, a metal screen, a metal grid, a perforated metal layer, or a spiral bound mesh.

In various examples, systems for manufacturing a composite membrane are described. The systems may include one or more of: an adherent polymer source; a polymer film manipulator; a porous support source; and/or a controller. The controller may be coupled to one or more of: the adherent polymer source, the polymer film manipulator, and/or the porous support source. The controller may be configured by machine-executable instructions. Instructions may be included to control the adherent polymer source and the sample manipulator effective to contact a first surface of an adherent polymer to a second surface of a porous graphene layer. The porous graphene layer may have a first surface that contacts a growth substrate. Instructions may be included to control the polymer film manipulator effective to remove the porous graphene layer together with the adherent polymer from the growth substrate. Instructions may be included to control the porous support source effective to provide a porous support substrate. Instructions may further be included to control the polymer film manipulator effective to contact the first surface or the second surface of the porous graphene layer to a surface of the porous support substrate to form the composite membrane. The surface of the porous support substrate may include at least one of: the first surface of the adherent polymer, a thermo-formable polymer characterized by a glass transition temperature, a woven fibrous membrane, or a nonwoven fibrous membrane.

In some examples, the systems may further include a heater and a temperature sensor. Instructions may be included to control the heater and the temperature sensor to heat one of the adherent polymer, the thermo-formable polymer, the woven fibrous membrane, or the nonwoven fibrous membrane over a glass transition temperature.

In several examples, the system may further include a sample manipulator operatively coupled to the controller. Instructions may be included to control the sample manipulator and the polymer film manipulator effective to contact the surface of the porous support substrate to the first surface of the porous graphene layer or the second surface of the adherent polymer. Instructions may also be included to control the sample manipulator and the polymer film manipulator effective to remove the adherent polymer from the porous graphene layer to form the composite membrane. Instructions may be included to control the sample manipulator and the polymer film manipulator effective to contact the surface of the porous support substrate to the first surface of the porous graphene layer, where the surface of the porous substrate may include the thermo-formable polymer. Instructions may be included to control the heater, the temperature sensor, the sample manipulator, and the polymer film manipulator effective to heat the first surface of the porous graphene layer and the thermo-formable polymer above the glass transition temperature.

In several examples of the systems, instructions may be included to control the heater and the temperature sensor effective to heat the porous graphene layer and the adherent polymer above the glass transition temperature. Instructions may be included to control the sample manipulator and the polymer film manipulator effective to contact the second surface of the porous graphene layer to the first surface of the adherent polymer. The adherent polymer may correspond to the thermo-formable polymer. Instructions may be included to control the sample manipulator, the polymer film manipulator, and the adherent polymer source effective to contact the adherent polymer onto the woven fibrous membrane or the nonwoven fibrous membrane. Instructions may also be included to control the heater and the temperature sensor effective to heat the porous graphene layer and the adherent polymer above the glass transition temperature. Instructions may also be included to control the sample manipulator and the polymer film manipulator effective to contact the second surface of the porous graphene layer to the first surface of the adherent polymer. The adherent polymer may be the woven fibrous membrane or the nonwoven fibrous membrane.

Instructions may also be included to control the sample manipulator and the polymer film manipulator effective to contact the porous support to at least one additional woven fibrous membrane or nonwoven fibrous membrane. The surface of the porous support substrate may include the woven fibrous membrane or the nonwoven fibrous membrane. Instructions may also be included to control the sample manipulator and the polymer film manipulator effective to contact the porous support substrate to a porous metal support. The porous metal support may include one or more of: a metal mesh, a metal screen, a metal grid, a perforated metal layer, or a spiral bound mesh.

In various examples, computer-readable storage media is described having instructions stored thereon for manufacturing a composite graphene membrane. Instructions may be included to control a sample manipulator to position a growth substrate. The growth substrate may support a porous graphene layer that has a first surface that contacts the growth substrate. Instructions may be included to control an adherent polymer source and the sample manipulator effective to contact a second surface of the porous graphene layer to a first surface of an adherent polymer. Instructions may also be included to control a porous support source effective to provide a porous support substrate. Instructions may further be included to control a polymer film manipulator effective to remove the porous graphene layer together with the adherent polymer from the growth substrate. Instructions may also be included to control the polymer film manipulator effective to contact the first surface or the second surface of the porous graphene layer to a surface of the porous support substrate to form the composite membrane. The surface of the porous support substrate may include at least one of: the first surface of the adherent polymer, a thermo-formable polymer characterized by a glass transition temperature, a woven fibrous membrane, and/or a nonwoven fibrous membrane.

In some examples of the computer readable storage media, instructions may be included to control the adherent polymer source and the sample manipulator effective to contact the surface of the porous support substrate to the first surface of the porous graphene layer or the second surface of the adherent polymer. Instructions may be included to control the sample manipulator and the polymer film manipulator effective to remove the adherent polymer from the porous graphene layer to form the composite membrane. Instructions may be included to control a heater and a temperature sensor effective to heat the first surface of the porous graphene layer and the thermo-formable polymer above the glass transition temperature. Instructions may also be included to control the sample manipulator and the polymer film manipulator effective to contact the surface of the porous support substrate to the first surface of the porous graphene layer. The surface of the porous substrate may include the thermo-formable polymer.

In several examples of the computer-readable storage media, instructions may be included to control a heater and a temperature sensor effective to heat the porous graphene layer and the adherent polymer above the glass transition temperature. Instructions may be included to control the sample manipulator and the polymer film manipulator effective to contact the second surface of the porous graphene layer to the first surface of the adherent polymer. The adherent polymer may correspond to the thermo-formable polymer. Instructions may be included to control the sample manipulator, the polymer film manipulator, and the adherent polymer source effective to contact the adherent polymer onto the woven fibrous membrane or the nonwoven fibrous membrane.

In several examples of the computer-readable storage media, instructions may be included to control a heater, a temperature sensor, the sample manipulator, and the polymer film manipulator effective to heat the porous graphene layer and the adherent polymer above the glass transition temperature and contact the second surface of the porous graphene layer to the first surface of the adherent polymer. The adherent polymer may be the woven fibrous membrane or the nonwoven fibrous membrane. Instructions may be included to control the sample manipulator and the polymer film manipulator effective to contact the porous support to at least one additional woven fibrous membrane or nonwoven fibrous membrane. The surface of the porous support substrate may include the woven fibrous membrane or the nonwoven fibrous membrane. Instructions may be included to control the sample manipulator and the polymer film manipulator effective to contact the porous support substrate to a porous metal support that may include one or more of: a metal mesh, a metal screen, a metal grid, a perforated metal layer, or a spiral bound mesh.

The term "substantially", as used herein, will be understood by persons of ordinary skill in the art and will vary to some extent depending upon the context in which it is used. If there are uses of the term which are not clear to persons of ordinary skill in the art, given the context in which it is used may mean up to plus or minus 10% of the particular term.

The terms "a" and "an" as used herein mean "one or more" unless the singular is expressly specified. For example, reference to "a base" may include a mixture of two or more bases, as well as a single base.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to, plus or minus 10% of the particular term.

As used herein, the terms "optional" and "optionally" mean that the subsequently described circumstance may or may not occur, so that the description includes instances where the circumstance occurs and instances where it does not.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations may be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, systems, or components, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops.

A typical manufacturing system may be implemented utilizing any suitable commercially available components, such as those typically found in data computing/communication and/or network computing/communication systems. The herein described subject matter sometimes illustrates different components contained within, or coupled together with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couple-able", to each other to achieve the desired functionality. Specific examples of operably couple-able include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms.

For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group. As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. For example, a group having 1-3 cells refers to groups having 1, 2, or 3 cells. Similarly, a group having 1-5 cells refers to groups having 1, 2, 3, 4, or 5 cells, and so forth. While various aspects and embodiments have been disclosed herein, other aspects and embodiments will be apparent to those skilled in the art.

The various aspects and embodiments disclosed herein are for purposes of illustration and are not intended to be limiting, with the true scope and spirit being indicated by the following claims.

What is claimed is:

1. A method to prepare a composite membrane, the method comprising:
   contacting a first surface of a porous graphene layer to a growth substrate;
   contacting a second surface of the porous graphene layer to a first surface of a fibrous porous support substrate, wherein the fibrous porous support substrate is comprised of woven or non-woven fibrous material;
   removing the porous graphene layer with the fibrous porous support substrate from the growth substrate;
   contacting a surface of the fibrous porous support substrate to a porous metal support, wherein the porous metal support includes one or more of a metal grid and a spiral bound mesh; and
   heating the porous graphene layer and the fibrous porous support substrate to form the composite membrane using a pressurized thermoforming process, wherein the pressurized thermoforming process includes a hot calendaring process.

2. The method of claim 1, further comprising:
   selecting the woven or non-woven fibrous material such that the fibrous porous support substrate includes a distribution of pores with an average pore diameter in a range between 5 nanometers and 250 micrometers.

3. The method of claim 1, further comprising:
   selecting the woven or non-woven fibrous material such that the fibrous porous support substrate includes a distribution of pores, wherein less than one pore per billion in the distribution of pores has a diameter greater than 4 times an average pore diameter.

4. The method of claim 1, further comprising:
   contacting the fibrous porous support substrate to at least one woven fibrous membrane or at least one nonwoven fibrous membrane.

5. The method of claim 1, wherein the first surface of the fibrous porous support substrate is softened and a surface contact between the second surface of the porous graphene layer and the first surface of the fibrous porous support substrate is increased, in response to heating the porous graphene layer and the fibrous porous support substrate to form the composite membrane using the pressurized thermoforming process.

6. The method of claim 1, wherein the porous graphene layer includes a first set of pores, the fibrous porous support substrate includes a second set of pores, and the first set of pores fail to occlude the second set of pores as a surface contact between the second surface of the porous graphene layer and the first surface of the fibrous porous support substrate is increased.

* * * * *